(12) United States Patent
Lenahan

(10) Patent No.: US 6,229,117 B1
(45) Date of Patent: May 8, 2001

(54) BREAD REFRESHING OVEN

(76) Inventor: Terrance F. Lenahan, 246 Unity Dr., Marietta, GA (US) 30064-5446

(*) Notice: Subject to any disclaimer, the term of this patent is extended or adjusted under 35 U.S.C. 154(b) by 0 days.

(21) Appl. No.: 09/524,601

(22) Filed: Mar. 14, 2000

Related U.S. Application Data

(62) Division of application No. 09/332,385, filed on Jun. 14, 1999.

(51) Int. Cl.[7] ............... A21B 1/22; A21B 3/02; A47J 36/24
(52) U.S. Cl. ............................ 219/411; 219/405
(58) Field of Search ................. 219/405, 411, 219/391; 99/451, 483; 426/237, 241–243; 250/504 R; 362/296, 297, 301, 310

(56) References Cited

U.S. PATENT DOCUMENTS

| | | | |
|---|---|---|---|
| 2,864,932 | * 12/1958 | Forrer | 219/405 |
| 3,037,443 | * 6/1962 | Newkirk et al. | 219/411 |
| 4,103,431 | * 8/1978 | Levinson | 34/259 |
| 4,164,643 | * 8/1979 | Peart et al. | 219/411 |
| 4,481,405 | * 11/1984 | Malick | 219/405 |
| 4,575,616 | * 3/1986 | Bergendal | 219/405 |
| 4,771,154 | * 9/1988 | Bell et al. | 219/405 |
| 5,382,441 | * 1/1995 | Lentz et al. | 426/241 |
| 5,472,721 | * 12/1995 | Eisenberg et al. | 426/243 |
| 5,517,005 | * 5/1996 | Westerberg et al. | 219/405 |
| 6,013,902 | * 1/2000 | Shimp, Jr. et al. | 219/451.1 |
| 6,069,345 | * 5/2000 | Westerberg | 219/411 |
| 6,087,634 | * 7/2000 | Cook et al. | 219/411 |

\* cited by examiner

*Primary Examiner*—Joseph Pelham
(74) *Attorney, Agent, or Firm*—Peter Vrahotes

(57) ABSTRACT

An oven capable of operating in the temperature range between 2500 F. and 4500 F. The heating element of the oven has at least one halogen lamp and the interior lining of the oven is rebonded fused silica foam.

6 Claims, 5 Drawing Sheets

BREAD REFRESHING OVEN

This application is a Div of Ser. No. 09/332,385 filed Jun. 14, 1999.

SUMMARY OF THE INVENTION

This invention is concerned with the process and apparatus for refreshing bread products, particularly open face items such as sliced rolls, buns, muffins, and the like. An oven is provided that is capable of producing high intensity infrared radiation from a relatively high temperature source, in the range of 2500–4500 F., using fast cycle methods. A bread product is placed in an oven at ambient and then exposed to the above mentioned infrared radiation for a period of 3 to 90 seconds as appropriate.

BACKGROUND OF THE INVENTION

As known by members of many households, there comes a time when bread products, such as rolls, buns, loaves, muffins and the like, lose their freshness and they may become hard or soggy. This produces a product that is often unsavory or unappetizing and is frequently discarded or used with a great deal of reticence. Although it is somewhat tolerable in a household, a commercial food serving business can find lack of freshness an economic drawback through the loss of customers.

Placing a bread product in a conventional heating or microwave oven does not refresh the bread product, but simply tends to produce a bread mass that is harder, hotter and oftentimes classified as inedible. By refreshing a bread product it is meant to partially restore the bread product to a state of freshness rendering the product more palatable. Clearly, such a process and apparatus for accomplishing the same would be both culinarily and financially desirable.

DETAILED DESCRIPTION OF THE PREFERRED EMBODIMENT(S)

Figure 1:
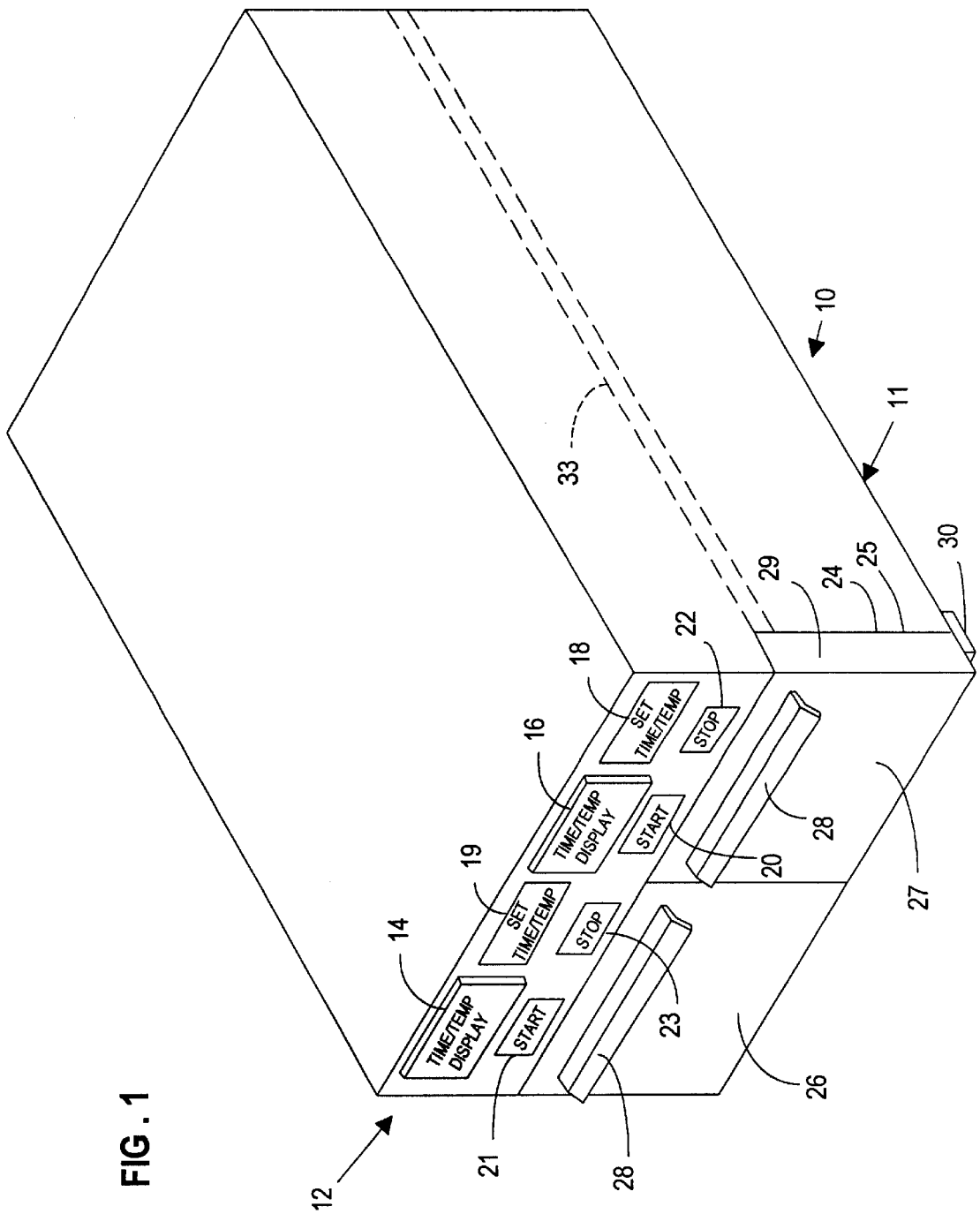
FIG. 1 is a perspective view of an oven in which the instant invention can be practiced.

With reference to FIG. 1, an oven is shown generally at 10 in which the instant invention can be practiced. The oven 10 has a housing 11 that includes a panel, shown generally at 12. The panel 12 includes a time/temperature displays 14, 16 and time/temperature controls 18, 19. Cycle start switches 20, 21 and stop/cancel buttons 22, 23 are provided.

The housing 11 has dual openings 24, 25 that receive doors 26, 27, each door having an insulated lining 29 that is receivable within the openings. A hinge assembly 30 connects the door to the housing 11 so that each door pivots about the hinge assembly to be receivable within the opening 24. As the hinge assembly 30 can be of any standard construction and does not form part of the invention, it will not be described in detail. Each door 26, 27 has a handle 28 attached thereto whereby the pivoting of the doors 26, 27 can be facilitated.

Figure 2:
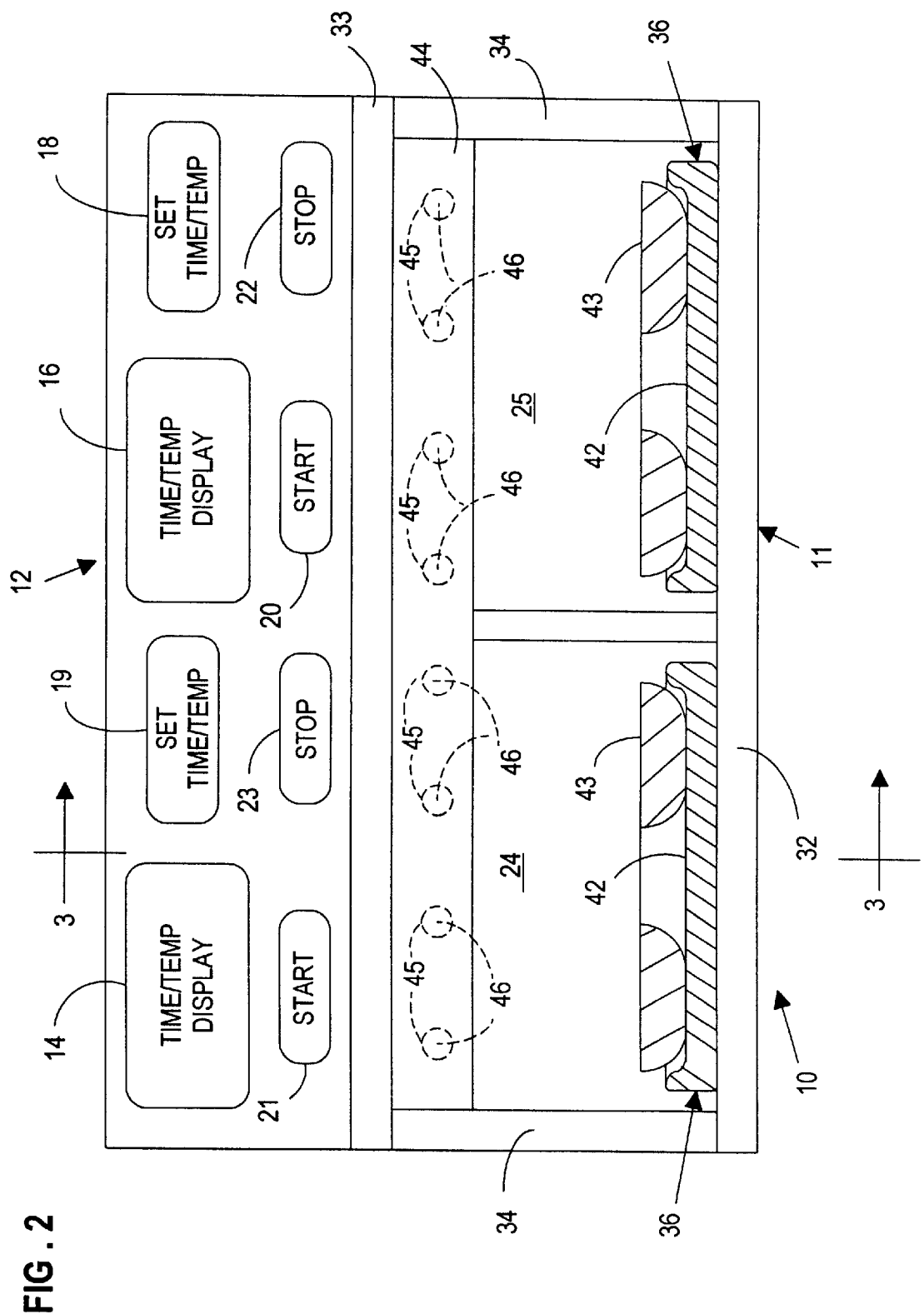
FIG. 2 is a frontal, cross sectional view of the oven shown in with the oven doors open.
Figure 3:
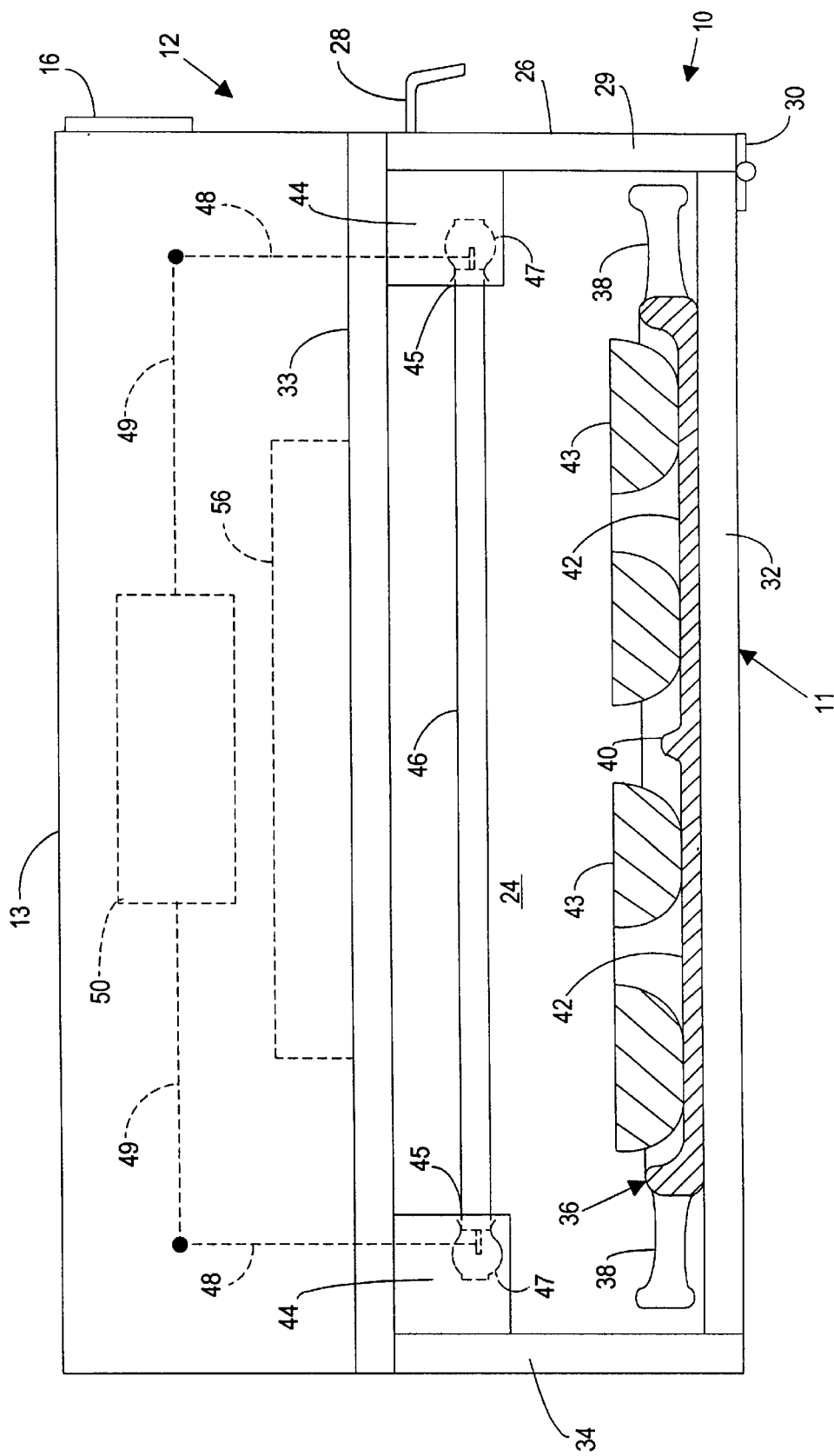
FIG. 3 is a cross sectional view of the oven shown in FIG. 1 taken along the lines 3—3 of FIG. 2.

Referring also to FIGS. 2 and 3, located within the housing 11 are an insulated floor 32, walls 34 and ceiling 33. The preferred insulation for the doors 26, 27 floor 32, walls 34, and ceiling 33 is rebonded fused silica foam which is a porous ceramic available as a commercial product from Cerndyne Thermo Materials, 3449 Church St., Scotdale, Ga. This rebonded fused silica foam, not only serves as an insulator but also as a reflector of the radiated energy employed in the instant invention. This special insulating, reflective material is a material that has a low maintenance cleaning characteristic as well as one that does not degrade and oxidize as other materials presently used in common oven construction. A tray 36 made of rebonded fused silica, in the form of a non-porous ceramic is provided and is also available from Cerndyne Thermo Materials, 3449 Church St. Scotdale, Ga. The tray 36 has a handle 38 on each end thereof as well as a raised separator 40 located intermediate to the handles and product nests 42. Shown supported by the tray 36 are two bread products 43 in the form of a sliced, opened bagel with each half 43 of the bagel resting within its nest 42 of the tray.

Two pairs of laterally opposed support members 44 are secured to the ceiling 35 and each has openings 45 therein for receiving an end of a tungsten-halogen, infrared generation lamp 46. Each opening 45 has a mounting clip 47 and an electrical lead 48 extends from each end of the lamps 46 and connects to electrical lead 49 which connects the lead 48 to control circuit 50. This lamp is commercially available from among General Electric Lighting, Nela Park, 1975 Noble Road, Cleveland, Ohio 44112-6300; Phillips Lighting Co., 200 Franklin Square Drive, Somerset, N.J. 08875-6800; and OSRAM Sylvania Inc., Specialty Lamps, 18725 N. Union Street, Westfield, Ind. 46074. It will be appreciated that the structure of the electrical circuit is within the knowledge of one skilled in the art and since the circuit structure does not form part of the novelty of this invention, it will not be described in detail.

Located in the upper portion of the housing 13 along with the electrical control circuit 50 is a cooling fan assembly 56. The function of the fan assembly 56, is to cool the seals of the infrared generation lamps 46 for the purpose of extending their life. It is not implied that this fan assembly 56 is for the purpose of circulating air through the oven chamber or is to be used as a convector as that would prove detrimental to the goal of the instant invention.

It has been found that exposing stale bread products 42 to infrared radiation of controlled wave length emanating from a lamp 46 operating at a temperature chosen between 2500 F. (degrees Fahrenheit) and 4500 F. for a chosen period of 3 to 90 sec. in an oven 10 results in the bread products being rendered refreshed. By being refreshed is meant that after exposure to the high intensity infrared radiation for the chosen period, the bread products become more palatable and tasty than they were prior to being exposed to the energy field contemplated by the instant invention. When attempts were made to refresh bread products in a standard oven or microwave oven, the results sought were not achieved. In fact, the stale bread products took on a staler state. This is because such ovens are not capable of producing the same energy field required to practice the instant invention.

Chosen as a severe test for this processing system was a muffin that had been in a stale, hard state as a result of being ignored for weeks in a package of muffins that was partially consumed. One half of the muffin was put through the refreshment process, the other half was not processed, for control and comparison purposes. The muffin was placed on the left side of the tray 36 as seen in FIG. 3 with the oven 10 at ambient. The lamp temperature control 14, 16 was set at approximately 3500 F. with the timer 14, 16 set to a 60 second cycle, using buttons 18, 19. The door was closed and power turned on by the start button 20, 21, then off again automatically after 60 seconds had elapsed by the timer 14, 16. The stop buttons 22, 23 are used in programming, and emergency stops.

The test results for the processed half were:

The muffin half attained an average body temperature in the range of 130 F.

There was significant moisture condensation on the rebonded fused silica tray, originating from the muffin half.

The original mass of the muffin half was 29.2 grams, after exposure, the mass was 26.0 grams.

Figure 4:
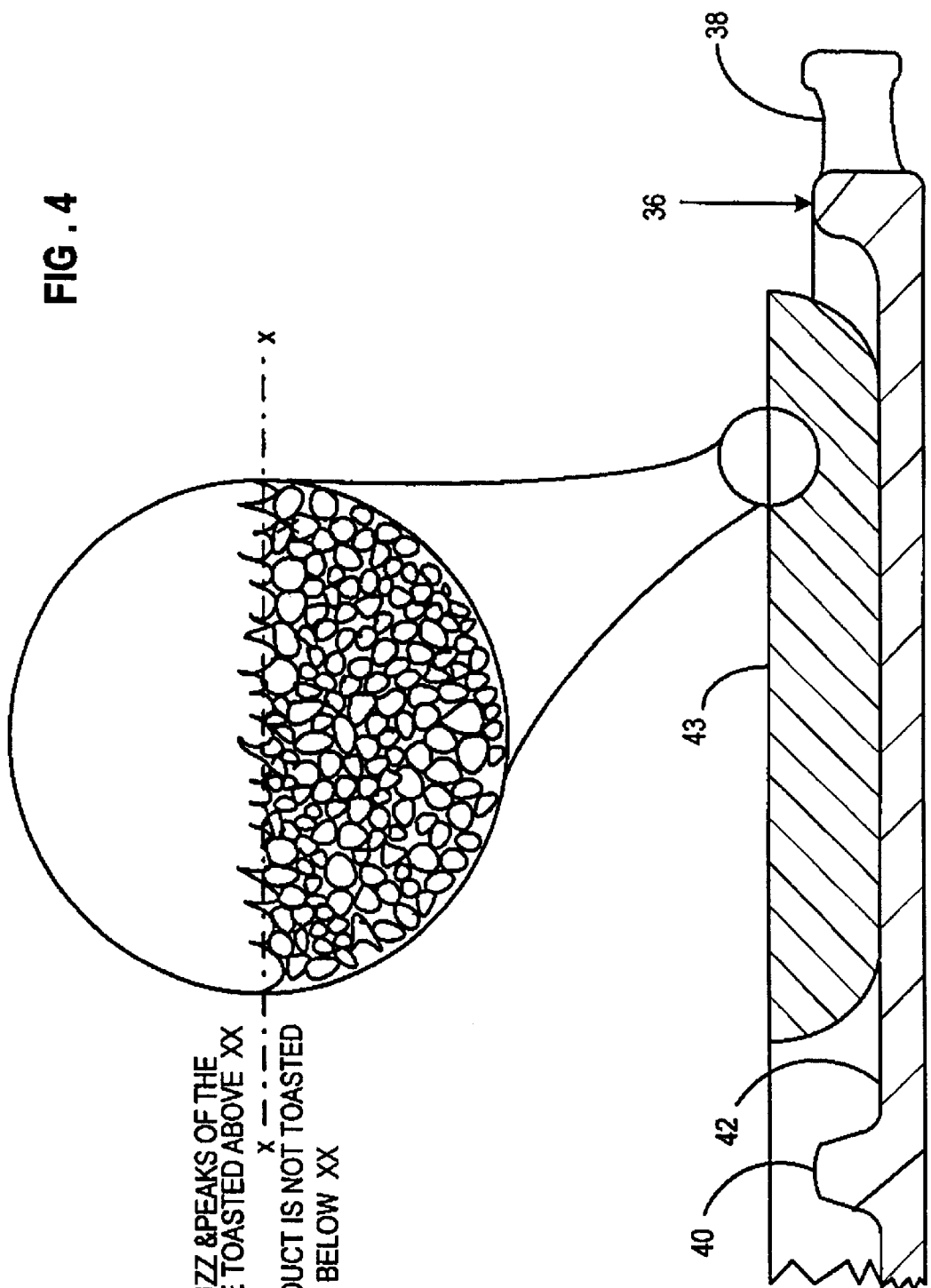
FIG. 4 shows a partially magnified, cross sectional view of a muffin that was treated in accordance with the instant invention.

A thin surface structure, as seen in see FIG. 4, on the open face of the muffin half 42 was toasted; whereas, below this surface the muffin was not toasted.

The refreshed muffin half 42 was eaten and found to be much more palatable than the control half. It was more pleasant to bite, and chew. A bonus to the refreshment was the addition of a delicate crunchy surface or toasted face. Also, the product gave off a greater aroma, as the I-R energy partially penetrated the porous muffin causing a reactivation of the yeast component with residual moisture thus emitting a far greater aroma than other heating methods.

Figure 5:
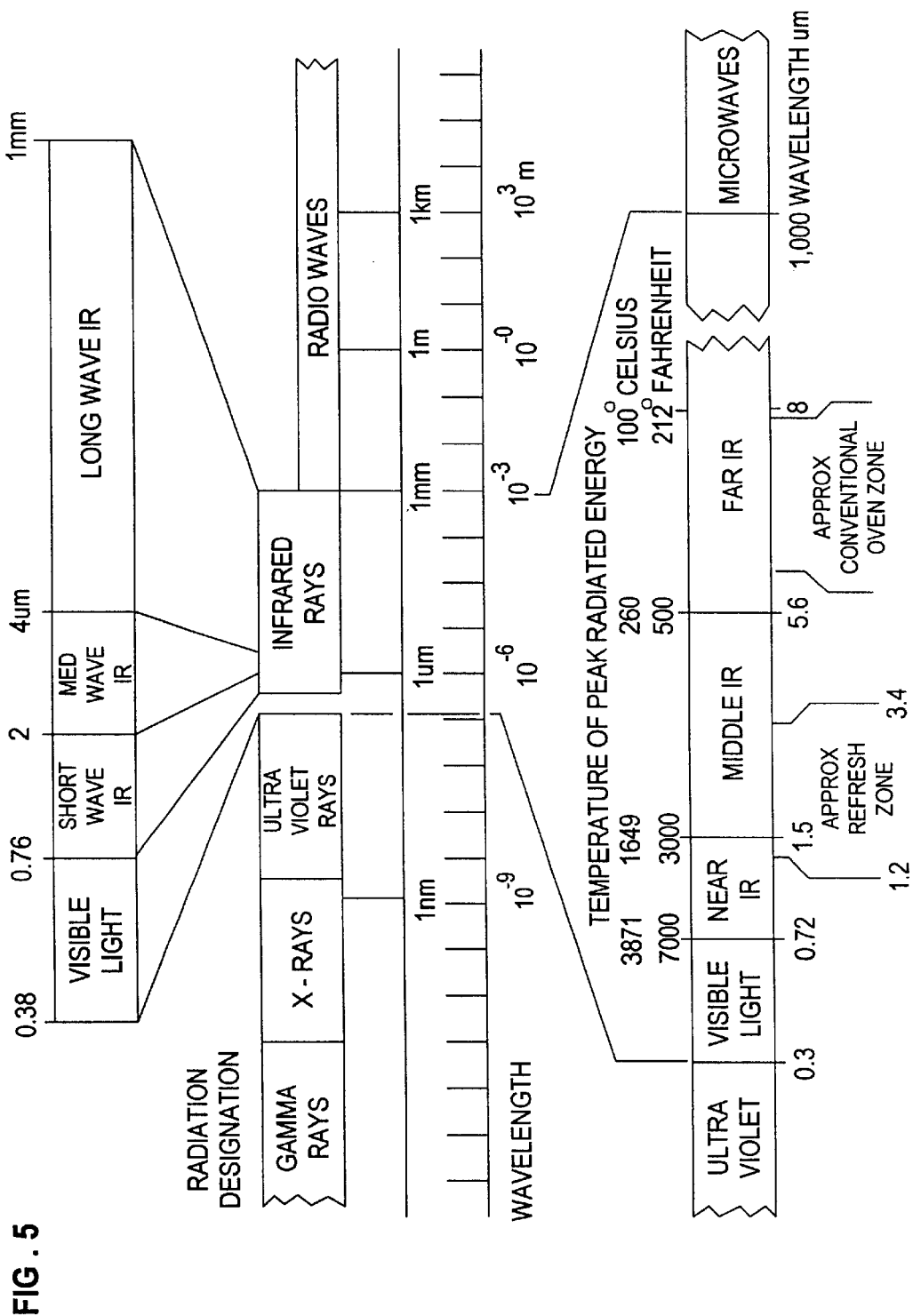
FIG. 5 is a chart of the electromagnetic spectrum comparing various wave lengths to those utilized in the instant invention.

It is believed that by subjecting the muffin half 42 to a controlled burst of electromagnetic radiation, with peak flux rate in the wavelength range of approximately 1.2–3.4 microns, for a period, between 3 and 90 seconds, causes a three-way beneficial reaction. As seen in FIG. 5, the selected wavelength is in a specific location of the electromagnetic wavelength spectrum. The wavelength required to carry out the invention is appreciably shorter than the wavelengths utilized with conventional ovens.

During exposure, it is believed that both the redistribution of the existing moisture and a revitalization of the yeast organisms occur deep within the body of the bread product. These two reactions coupled with a light steam exposure of the extreme distal extensions of the open-faced structure as seen in FIG. 4, make a delightfully, chewy and flavorful bread product.

A number of bread products 43, including bagels and rolls, were refreshed as described above with similar results being achieved. It has been found that the temperature of the halogen lamps 46 should be between 2500 F. and 4500 F. for periods of between 3 sec. to 90 sec., the preferred temperature level will vary depending on the products exposed, i.e. as seen in FIG. 5, the wavelength of the peak flux rate is selected at a value between 1.2 and 3.4 microns as illustrated.

Important aspects of the oven 10 are the fast control of the infrared lamps and quick access to the interior of the oven so that the bread products can be exposed to precise energy doses and removed promptly. It is necessary that the energy input to the bread products 43 be stopped precisely otherwise at these high energy flux rates the bread products will overheat rapidly and completely lose their residual moisture or ultimately burn to a crisp. The reflective nature of the oven enclosure insulation 29, 32, 33 and 34 prevents the oven from overheating while directing the energy into the bread product itself.

Thus, although the invention that has been described as used to refresh stale bread products, it will be appreciated that the oven 10 can also be used for original baking and with fresh bread products if desired.

What is claimed is:

1. An oven for refreshing bread products, comprising:

a) A housing having an opening therein and a reflective insulating interior, b) at least one door having a rebonded fused silica film lining receivable within said opening, c) a heating element having the characteristic of heating to temperatures between 2500 F. and 4500 F.

2. The oven of claim 1 wherein said heating element is a halogen lamp.

3. The oven of claim 1 including a bread product tray of rebonded fused silica foam receivable within said oven.

4. The oven of claim 1 wherein said heating element is a halogen lamp.

5. The oven of claim 1 further including an electrical control circuit in electrical connection with said halogen lamp.

6. The oven of claim 5 further including a timer in communication with said electrical control circuit.

* * * * *